(12) United States Patent
Oberg et al.

(10) Patent No.: US 12,387,021 B2
(45) Date of Patent: Aug. 12, 2025

(54) USING INFORMATION FLOW FOR SECURITY AWARE DESIGN AND ANALYSIS

(71) Applicant: Cycuity, Inc., San Jose, CA (US)

(72) Inventors: Jason K. Oberg, Redwood City, CA (US); Alric Althoff, San Jose, CA (US); Andreas Kuehlmann, Kensington, CA (US)

(73) Assignee: Cycuity, Inc., San Jose, CA (US)

( * ) Notice: Subject to any disclaimer, the term of this patent is extended or adjusted under 35 U.S.C. 154(b) by 658 days.

(21) Appl. No.: 17/834,815

(22) Filed: Jun. 7, 2022

(65) Prior Publication Data
US 2023/0394207 A1   Dec. 7, 2023

(51) Int. Cl.
| | | |
|---|---|---|
| *G06F 30/327* | (2020.01) | |
| *G06F 21/57* | (2013.01) | |
| *G06F 30/33* | (2020.01) | |
| *G06F 30/3308* | (2020.01) | |
| *G06F 30/34* | (2020.01) | |
| *G06F 30/367* | (2020.01) | |
| *G06F 30/398* | (2020.01) | |

(52) U.S. Cl.
CPC .......... *G06F 30/327* (2020.01); *G06F 21/577* (2013.01); *G06F 30/33* (2020.01); *G06F 30/34* (2020.01); *G06F 30/3308* (2020.01); *G06F 30/367* (2020.01); *G06F 30/398* (2020.01)

(58) Field of Classification Search
CPC .... G06F 30/327; G06F 30/3308; G06F 30/34; G06F 30/33; G06F 30/367; G06F 30/398; G06F 21/577

USPC .................... 716/104, 106, 111, 136; 703/14
See application file for complete search history.

(56) References Cited

U.S. PATENT DOCUMENTS

| | | | |
|---|---|---|---|
| 10,289,873 B2 | 5/2019 | Oberg et al. | |
| 10,558,771 B2 | 2/2020 | Blair et al. | |
| 2012/0066770 A1* | 3/2012 | Hayashi | G06F 21/54 726/26 |
| 2017/0316227 A1* | 11/2017 | Oberg | G06F 21/50 |
| 2018/0032760 A1* | 2/2018 | Hu | G06F 21/71 |
| 2018/0129720 A1* | 5/2018 | Kim | G06F 16/248 |
| 2019/0005173 A1* | 1/2019 | Blair | G06F 30/33 |
| 2019/0156028 A1* | 5/2019 | Hay | G06F 21/563 |

(Continued)

FOREIGN PATENT DOCUMENTS

WO   WO-2014143912 A2 *  9/2014  ............. G06F 21/60

*Primary Examiner* — Phallaka Kik
(74) *Attorney, Agent, or Firm* — Fish & Richardson P.C.

(57) ABSTRACT

Methods, systems, and apparatus, including computer programs encoded on computer storage media, for performing information flow analysis on hardware designs to identify vulnerabilities. One of the methods includes generating input signals and feeding the generated input signals into the modified hardware design to generate a plurality of information flow signals, wherein the information flow signals each associate a respective input signal with a location in the modified hardware design to which the input signal was able to reach through logic circuitry of the modified hardware design. The generated information flow signals are evaluated according to one or more security criteria to generate security results. One or more security related applications are performed to generate information representing aspects of the design that are vulnerable to insecure behavior.

20 Claims, 8 Drawing Sheets

(56) References Cited

U.S. PATENT DOCUMENTS

| | | | |
|---|---|---|---|
| 2021/0160157 A1* | 5/2021 | Yadav | H04L 47/32 |
| 2022/0035912 A1 | 2/2022 | Wilkerson et al. | |
| 2022/0100869 A1* | 3/2022 | Berger | G06F 21/566 |
| 2022/0138351 A1* | 5/2022 | Oberg | G06F 21/577 |
| | | | 326/8 |
| 2023/0394158 A1* | 12/2023 | Oberg | G06F 21/577 |
| 2023/0412575 A1* | 12/2023 | Miyamoto | H04L 63/0485 |
| 2025/0103731 A1* | 3/2025 | Berger | G06F 21/552 |

\* cited by examiner

USING INFORMATION FLOW FOR SECURITY AWARE DESIGN AND ANALYSIS

BACKGROUND

This specification relates to analyzing the designs of electronic devices to identify and prevent vulnerabilities.

Vulnerabilities in the hardware designs of electronic devices can make such devices susceptible to leaking of sensitive information or susceptible to malicious attacks that can modify how the device works. It is particularly important to identify such vulnerabilities in the design phase because such vulnerabilities may not be fixable after fabrication, unlike a software vulnerability that can be fixed with a patch. But identifying such vulnerabilities has typically relied on pre-fabrication manual inspection. Conventional approaches essentially require guessing the security weaknesses and then either building a mitigation or performing manual penetration testing to see if there is actually a problem.

SUMMARY

This specification describes how a hardware design can be automatically analyzed with information flow tracking to identify or mitigate the likelihood of vulnerabilities, e.g., confidentiality vulnerabilities or integrity vulnerabilities.

Confidentiality vulnerabilities are aspects of a hardware design that allow for unintended access to a critical design asset. A critical design asset is secret information stored by part of a hardware design. Therefore, a critical design asset should not be accessible from unexpected or unintended parts of the design. For example, a critical design asset can be a cryptographic key used by a chip to encrypt or decrypt sensitive information for processing at runtime. As another example, critical design assets can include proprietary weights of a machine learning model that were generated from extensive and highly expensive training in a datacenter. These are both examples of digital values that should be protected from confidentiality vulnerabilities.

Integrity vulnerabilities are aspects of a hardware design that allow for modification of data or configurations in unexpected or unintended ways. For example, an integrity vulnerability can arise from a flaw in the hardware design that allows an attacker to overwrite configuration information that can allow an attacker to execute unauthorized code.

Particular embodiments of the subject matter described in this specification can be implemented so as to realize one or more of the following advantages. The techniques described in this specification provide a foundation for unique insights into difficult-to-detect vulnerabilities in hardware designs and automatically guide physical implementation decisions throughout the semiconductor design process. By leveraging information representing where information flows in a design, a system can automatically identify security-critical aspects of a hardware design to detect vulnerabilities and/or change the structure of the chip to mitigate them after manufacturing. In many cases this will make it possible to identify and mitigate issues that would be impossible to fix post-silicon and which may lead to product recalls or a weakening of the security posture of microelectronics that are critical to modern systems.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
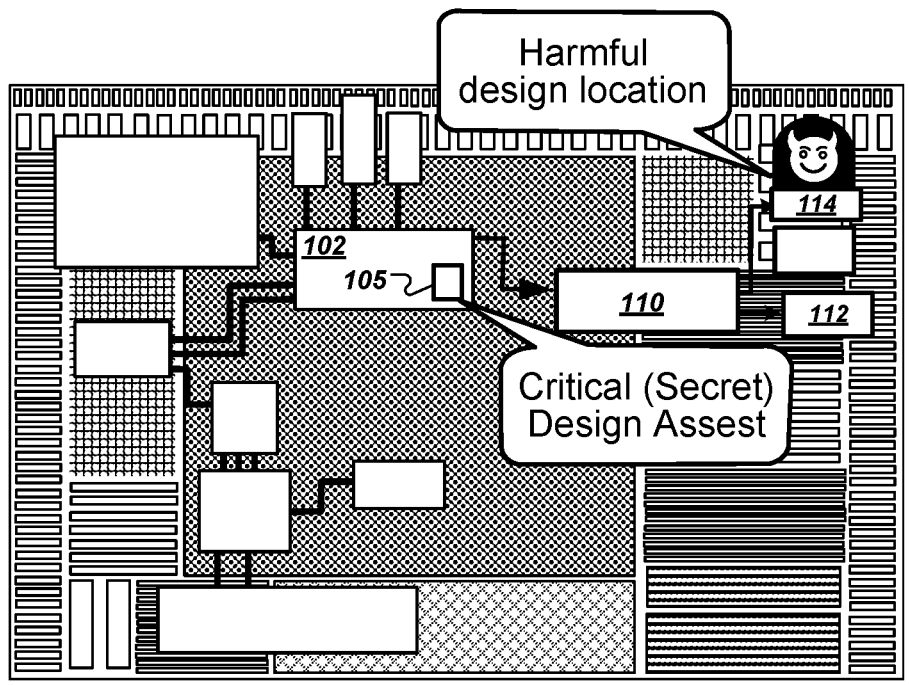
FIGS. 1A-B are visualizations of using information flow tracking to perform confidentiality and integrity analyses.
Figure 1B:
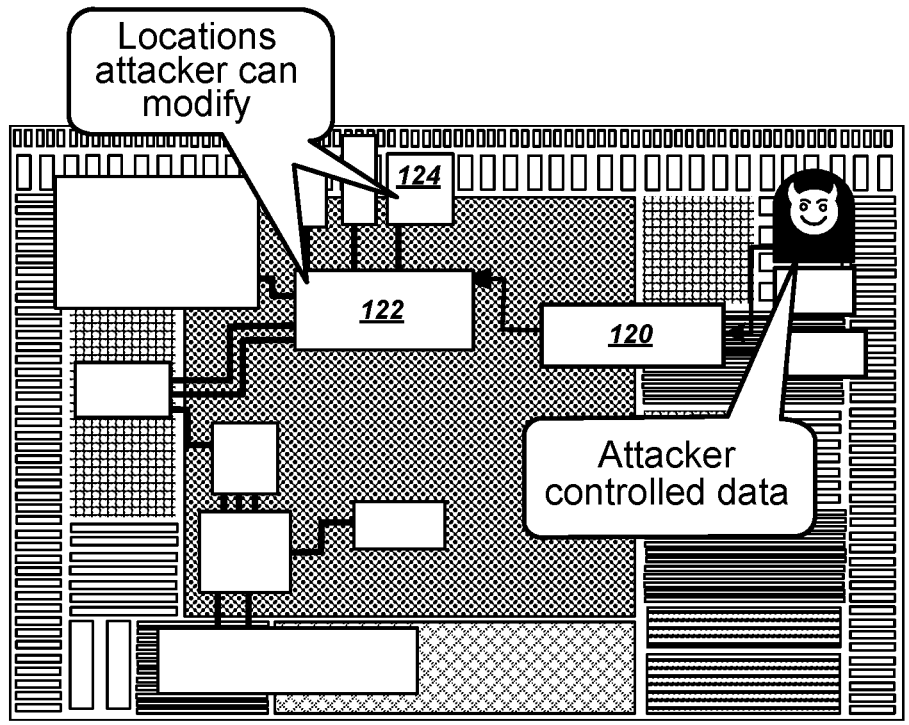

FIGS. 1A-B are visualizations of using information flow tracking to perform confidentiality and integrity analyses.

As shown in FIG. 1A, information flow tracking can be used to determine where in a hardware design a critical design asset 105 can flow. Information flow tracking can be used to determine whether the critical design asset 105 can flow to a potentially harmful design location, e.g., the component 114, which might be a location where it can be accessed by an attacker. The techniques described in this specification can be used to determine that the critical design asset 105 can flow from an initial component 102, to other components 110, 112, and 114. The last component 114 is a potentially harmful design location because it is a portion of the device that is potentially accessible by an attacker.

As shown in FIG. 1B, information flow tracking can also be used to determine what items can be modified due to the introduction of attacker-controlled data at a particular point in the design. Thus, information flow tracking can be used to determine how attacker-specified data might flow through components 120, 122, and 124, which can be a location that stores settings or configurations. Thus, the information flow tracking techniques described in this specification can identify how such an information flow can cause the device to be modified in unexpected ways.

Figure 2:
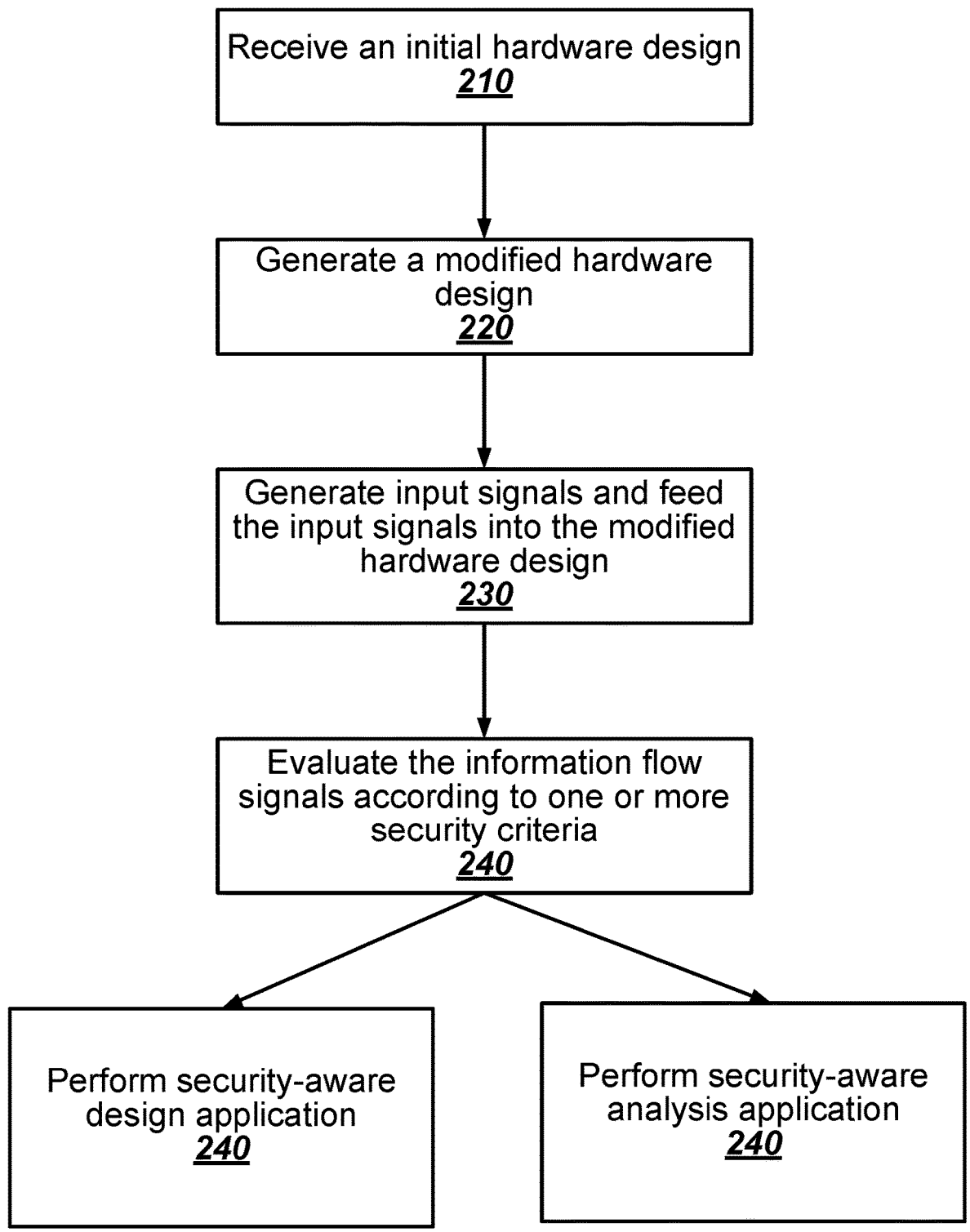
FIG. 2 is a flowchart of an example process for generating an information flow signal database.

FIG. 2 is a flowchart of an example process for generating an information flow signal database. The example process can be performed by a system of one or more computers in one or more locations and programmed in accordance with this specification. The example process will be described as being performed by a system of one or more computers.

The system receives an initial hardware design (210). The initial hardware design specifies at least hardware components and which hardware components can communicate data to other hardware components. The initial hardware design may, but need not, have fully specified routing information about the exact routing assets that will connect the hardware components in the design. The initial hardware design can be in any appropriate format, e.g., hardware design language files, a netlist representation, or an application-specific format, to name just a few examples.

The system generates a modified hardware design (220). The modified hardware design includes additional hardware elements to implement information flow tracking. The addition of the hardware elements to the design provides a mechanism for tracking which input signals flow to which components of the design.

The number and locations of the additional hardware elements can be application-specific. For example, if the information flow analysis being performed for confidentiality vulnerabilities, the additional hardware elements can be used to track whether critical design assets can flow to an attacker-controller region. To do so, the additional hardware elements can propagate a label for an information signal that indicates that the information signal could possibly contain critical design assets. The label is then propagated wherever the information signal can flow.

As another example, if the information flow analysis being performed is to detect or prevent integrity vulnerabilities, the additional hardware elements can be used to track all locations that attacker-controller data can flow to. The attack surface can thus be specified, which is a set of hardware components that can be modified by an attacker. The end result is a list of locations that can be affected by data anywhere on the attack surface.

In some implementations, the modified hardware design can be generated by a software tool that parses a high-level security language. Such techniques for using high-level security languages are described in more detail in commonly-owned U.S. Pat. No. 10,289,873, which is incorporated herein by reference. Other techniques are described in more detail in commonly-owned U.S. Pat. No. 10,558,771, which is also incorporated herein by reference.

The system generates input signals and feeds the input signals into the modified hardware design to generate information flow signals (230). In other words, the system exercises the functionality of the hardware design using input signals. During this process, the additional hardware elements that were inserted for the information flow analysis operate to trace the labels of data of interest, be it of critical design assets or of attacker-controlled data.

The system can use any appropriate technique for generating input signals for the design. As one example, a system can perform a concrete simulation. During a concrete simulation, the system feeds the modified hardware design with a concrete set of 0s and 1s in order to stimulate the flow of information through the design. Performing a concrete simulation has the advantage of introducing randomness or specially designed bit patterns into the design in order to stimulate the model. This can allow the design to be analyzed for rare situations that might not happen during normal operation but that may happen during an attack.

As another example, the system can perform a device prototyping process by connecting the device to a real or simulated operating environment. For example, if the hardware design is an image processor on a mobile phone, the design can be connected to a simulated operating environment in which commands to process images as well as the input images themselves are introduced as input signals for the design. Using a prototyping process can allow for more efficient identification of vulnerabilities that arise during normal usage.

The system evaluates the information flow signals according to one or more security criteria to generate security results (240). The system can use any appropriate set of security criteria to identify or add design alterations to mitigate vulnerabilities in the hardware design from the generated information flow signals. The security criteria can depend on the type of information flow analysis being performed.

For example, for confidentiality vulnerabilities, the system can assess the information flow signals to determine whether any information flow signal represents a critical design asset flowing to an unexpected location. For integrity vulnerabilities, the system can assess whether attacker-controlled data can flow to an unexpected location. The system can generate security results data that represents information flow signals that satisfy one or more security criteria.

In some implementations, the system stores the generated information flow signals in an information flow signal database and queries the database to generate the security results. For example, the system can query the information flow signals database using queries that represent the one or more security criteria, and the result of the query is then the security results. For example, the system can issue a query to the database that requests all rows representing all the locations to where a critical design asset flowed and perform a join with rows representing locations that critical design assets are not expected to flow. The results of such a query pinpoint confidentiality vulnerabilities in the hardware design. Similarly, the system can query the database using a query that retrieves rows representing all the locations to where attacker-controller data flowed and then performs a join with rows representing locations that attackers should not be able to access or modify. The results of such a query reveal vulnerabilities in the design that may be prone to attack.

The system uses the security results to perform a security aware design application (250) or a security analysis application (260). The security results generated from the information flow signals and the security criteria can be used to support a variety of security related applications, which can be generally classified as security aware design applications or security analysis applications. With the ability to know the actual location of design assets (for confidentiality) or impact of the attack surface (for integrity), security applications become significantly more scalable, repeatable, and more easily understood.

For security aware design applications (250), the system automatically generates information that aids the design process. A user can use this information to alter the physical layout of how the chip is actually built, e.g., how wires are routed, where transistors are placed, and where shielding is placed, to name just a few examples. The system can for example use the security results to compute metrics for various regions of the design and generate user interface presentations that display such information. This information can be used to guide the design process to mitigate security vulnerabilities from occurring in regions where they are most likely, which can happen before the hardware is fabricated. During this process, actual vulnerabilities may or may not be identified. Rather, the system will determine where to insert mitigations to protect against vulnerabilities after fabrication.

As a first example, the system can score and rank regions of the design that require mitigations. For example, the system can use the security results to indicate which regions of the design are most vulnerable to certain types of attacks. The system can then generate a user interface presentation that visually distinguishes the most vulnerable regions from other regions, e.g., by highlighting or calling out those regions or presenting them in a different color.

As another example, the system can provide suggestions about which areas of the design require certain types of design mitigations. For example, adding EM shielding to parts of a chip can make the chip more secure against side channel attacks, but adding such shielding to the entire design can be technically infeasible or cost prohibitive. Instead, the system can suggest a single region among many regions that is the most vulnerable to side channel attacks, e.g., because that is the only region through which a critical design asset flows. The user can then use this information to add EM shielding to that region of the design only.

The system can also automatically filter out information flow signals that are not affected or are least affected by the security criteria. This process helps hardware designers quickly and easily focus on the aspects of the design that are most relevant to security.

Another example category of security aware design application is design obfuscation. For example, the system can use the security results to identify locations that need obfuscation, which is a technique used to protect the design or behavior of a chip from easily being reverse engineered.

Another example category of security aware design applications is secure routing. As part of the semiconductor design process, EDA tools can route wires to optimize for power and latency. Alternatively or in addition, the system can use the security results to identify routing assets that need to be as secure as possible, e.g., because they carry critical design assets. Thus, the system can suggest that a routing resource that carries a critical design asset be routed toward the inner portion of the chip rather than along the edges of the chip.

For security analysis applications (260), the system automatically generates information that characterizes aspects of an existing design, which might occur after the design has been fabricated. For example, the system can use the security results to rank information flow signals in the design according to their security risks. If vulnerabilities are found, this information can be used to change the functional behavior of the design in order to mitigate the vulnerability. For example, the firmware can be changed in order for the chip not to be able to enter a mode where insecure behavior could occur.

As part of this process, the system can provide suggestions about which aspects of the design are vulnerable to being exploited. The system can generate a user interface presentation that visually distinguishes vulnerable signals from other information flow signals. The system can also automatically filter out information flow signals that are the least vulnerable so that designers can focus their analysis on the most vulnerable regions.

Another example category of security related applications is security verification. With security verification, users specify security rules (based on information flow) and execute them in simulation and/or emulation, which can result in a pass/fail result output.

Another category of security analysis applications is security exploration. Security exploration refers to a suite of related technologies that allow a user to interactively explore a design and inspect how signals of interest flow through the design. Using the generated security results and other information flow data, a user can explore the impact of critical design assets or explore the attack surface in order to analyze the behavior of known weaknesses or identify unknown weaknesses.

Security exploration tools are useful because often during the security review and planning processes the specific security requirements to validate are not entirely known. This can make identifying security weaknesses in the design an open-ended, resource intensive process that requires extensive manual review, which can often leave security teams with limited data and evidence to support the assurance of the design.

Security exploration tools add capabilities to aid the verification process by allowing the user to explore the confidentiality and integrity of critical design assets to identify design weaknesses. This not only helps identify unknown and subtle weaknesses in the design but also helps refine security requirements that can then be effectively verified using other security verification features. Furthermore, the data generated from the analysis can provide invaluable supporting evidence for the security of critical design assets that would be unavailable using existing analysis techniques.

Figure 3:
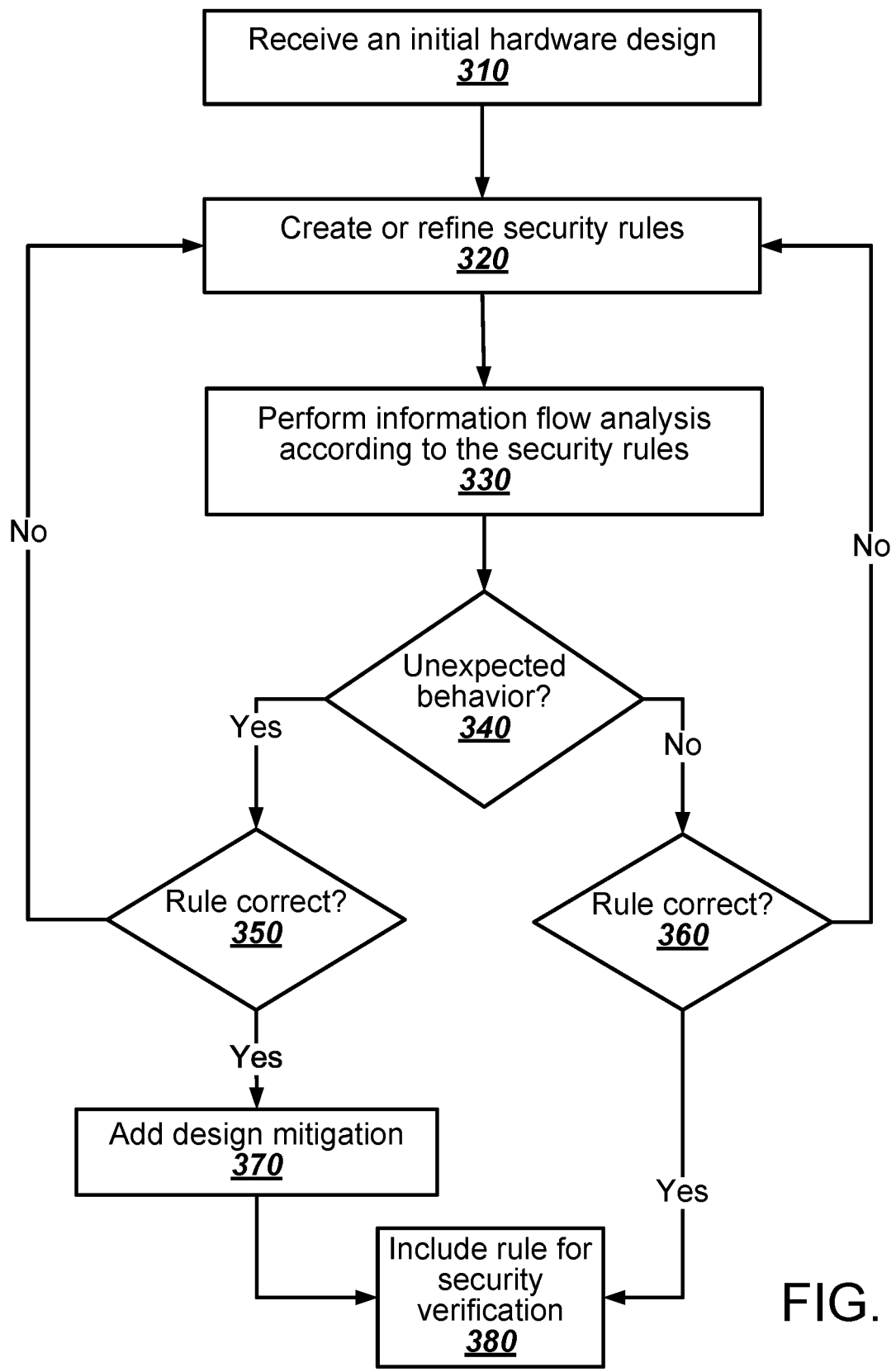
FIG. 3 is a flowchart of an example process for creating and refining security rules.

FIG. 3 is a flowchart of an example process for creating and refining security rules. The process is an example of a process that can be undertaken by a security analyst using the information flow tracking and security exploration tools described in this specification.

A security analysis system receives an initial hardware design (310). As described above, the hardware design can be specified in any appropriate format and may or may not include complete specification of resources.

Security rules are created or refined (320). As described above, different security rules can be used for different aspects of security verification. Confidentiality vulnerability rules make assertions about the flow of critical design assets, and integrity vulnerability rules make assertions about what modules can be modified from an attack surface. However, neither critical design assets nor the attack surface of a design need to be fully specified in order to perform security exploration. As will be seen below, the security exploration tools described in this specification allow for unexpected behaviors to be discovered without knowing about these aspects in advance.

The security analysis system performs information flow analysis according to the security rules (330). As described above, the system can parse the rules to automatically generate a modified hardware design having information flow tracking logic that keeps track of labels that flow with information through the design.

The design is analyzed for unexpected behavior (340). A security researcher can use a suite of tools described in more below to determine whether the design has unexpected behavior. These tools can include a system asset visualizer, a waveform view, and a path view.

If no unexpected behavior is identified, the security rules can be checked for correctness (branch to 360). If the rule is incorrect (360), the security rule can be flagged for refinement and its results flagged as possible false negatives. Thus, the security rule can be refined and the information flow analysis process restarted (branch to 320).

If the rule is correct, the rule can be included as part of a set of security verification rules to ensure that changes to the design or test bench do not introduce any new security weaknesses (branch to 380).

If unexpected behavior is identified, the security rules can be checked for correctness (branch to 350) to determine if the rule needs refinement and whether the results contain false positives. If so, the rule can be refined and the security analysis process restarted (branch to 320).

If the rule is correct, the rule can be used to add a design mitigation (branch to 370). The design mitigation is a change to the hardware design that prevents the discovered weakness from happening again. The rule can then still be added to the set of security verification rules (branch to 380) so that the same weakness is not reintroduced later.

Figure 4:
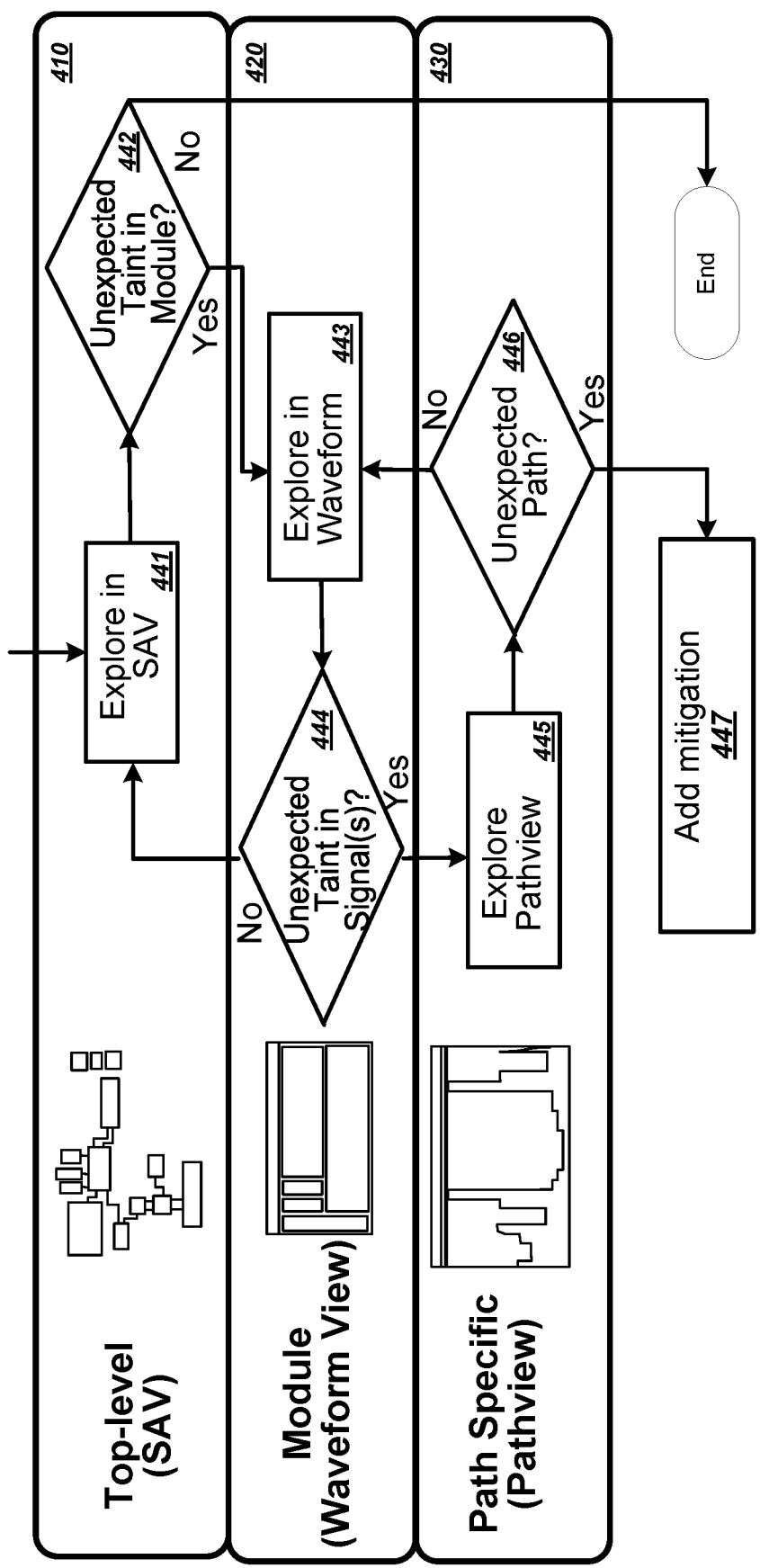
FIG. 4 illustrates an example workflow using three security exploration tools at three different levels of granularity.

FIG. 4 illustrates an example workflow using three security exploration tools at three different levels of granularity. A system asset visualizer (SAV) provides a top-level view 410 of the design. A waveform view tool provides a module-level view 420 of the design, and a path view tool provides a path-specific view 430 of the design.

The example workflow can start with a user exploring in the SAV (441). The SAV can provide a visualization of signals within each module of a design. The SAV allows thus users to see where in the design the critical design assets are located.

If the SAV indicates that a module has an unexpected taint (442), a user can explore the design at a lower level using a waveform view tool (branch to 443). If not, the process can end (branch to end).

The waveform view tool to analyze waveforms of signals within a module. If the waveform view indicates an unexpected taint in a signal (444), a path view tool can be used to analyze paths within the design (branch to 445). If not, the user can continue to explore in the SAV (branch to 441).

If an unexpected path is identified in the path view (446), the design can be said to have unexpected behavior, and a user can take appropriate steps to design a mitigation (447), as described above. If not, the user can return to explore in the waveform view (branch to 443).

Each of these security exploration tools will now be described in more detail. Their capabilities will be demonstrated with reference to an example chip having a True Random Number Generator (TRNG), multiple SRAMs, and a processing core.

From a security perspective, a TRNG is an important design asset that needs to be protected. Thus, information that it generates might be exposed in ways that constitute a design weakness. The security exploration tools described below can provide resources for understanding how a critical design asset, e.g., an output of the TRNG, can be exposed.

First, a security rule can be defined that generates a failure indicator whenever the output of the TRNG exits a security boundary. The security boundary need not be exactly known, and even rough ideas of where the security boundary is can be used to easily find time points where an issue might arise. Then, information flow analysis can be performed on the design as described above with reference to FIG. 2. The results of the security rules can then be analyzed for design weaknesses.

Figure 5:
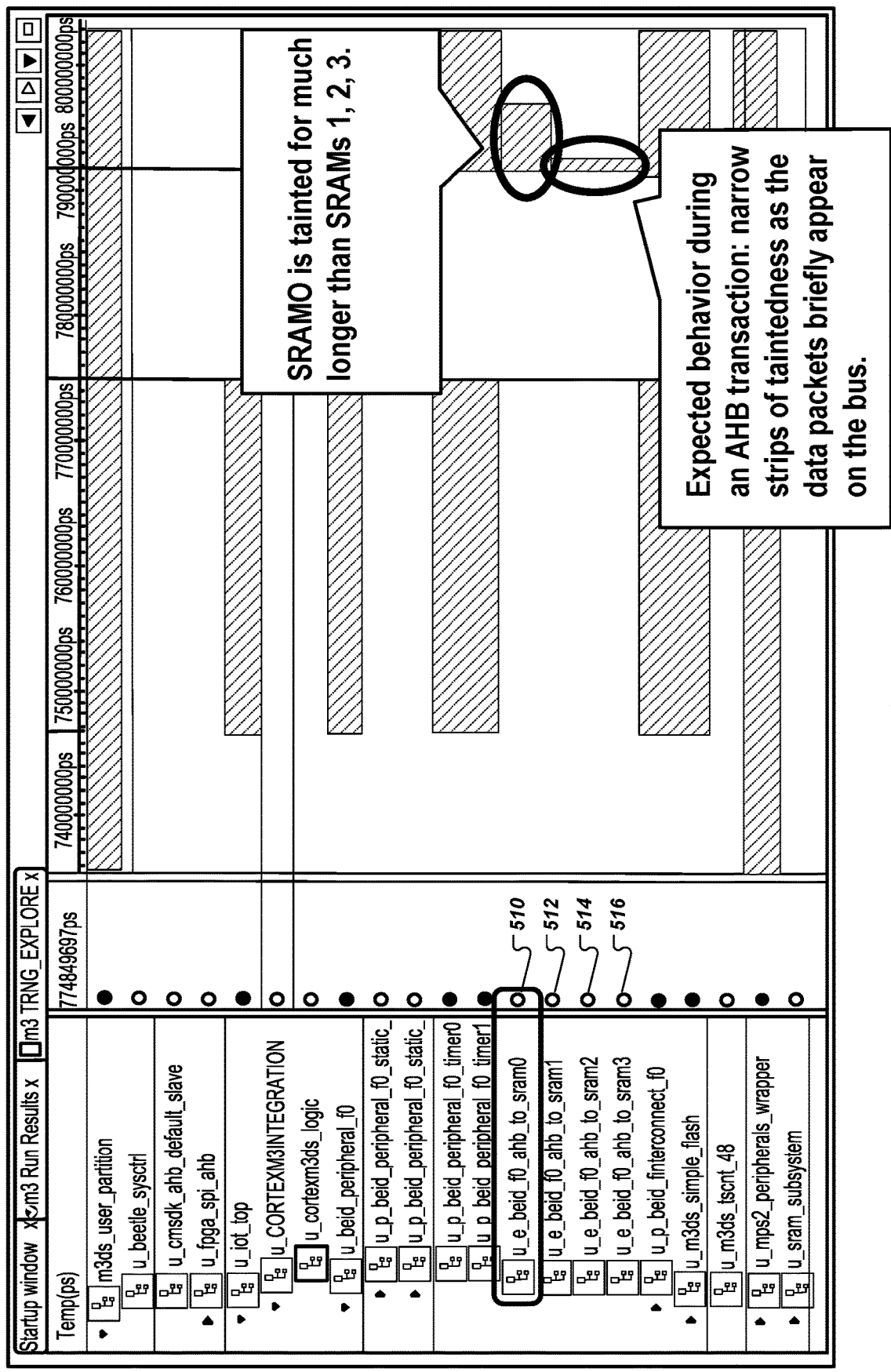
FIG. 5 illustrates a screenshot from an example system asset visualizer.

FIG. 5 illustrates a screenshot from an example system asset visualizer. A system asset visualizer provides a high-level data visualization of asset activity across the design hierarchy.

As shown in FIG. 5, the output of the TRNG travels through various modules in the system hierarchy. The system asset visualizer (SAV) illustrates which modules contain the TRNG output and over what times. In addition, the SAV illustrates the point at which the security rule triggered a failure indication by the TRNG output exiting the security boundary.

The visualization in FIG. 5 shows that the TRNG asset ends up at multiple different SRAM modules. However, the TRNG asset persists in just one of them, SRAM0 510, for much longer than the other SRAMS 512, 514, and 516. The SAV thus provides a mechanism for making this distinction very clear, which is important because this phenomenon is a subtlety that might be missed by other mechanisms.

Due to the difference in behavior exhibited by the SRAMs, the waveform view can be used to investigate further.

Figure 6A:
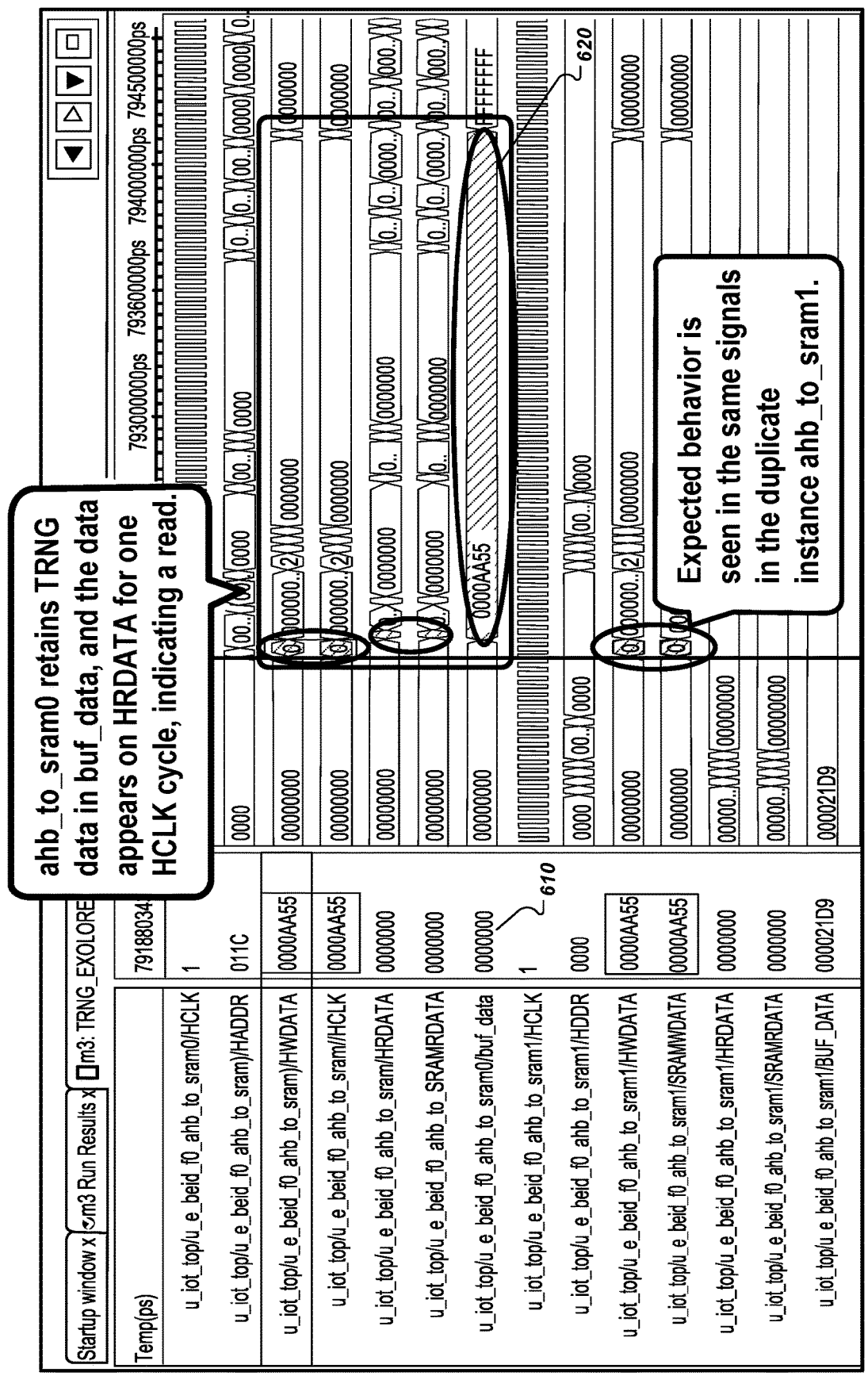
FIGS. 6A-B illustrate screenshots from example waveform views.

FIG. 6A illustrates a screenshot from an example waveform view. The waveform view provides a unique capability to look at specific details that are flagged by the SAV. In this example, the anomalous SRAM is being investigated with the waveform view.

The waveform view provides two options for analyzing the flow of the TRNG asset: 1) add all signals that contain the TRNG asset within the SRAM module, 2) trace the forward loads from inputs of the SRAM module that contain the TRNG asset. In this example, the first option is chosen due to the relatively small number of signals in the SRAM module.

As shown in the trace 620 of FIG. 6A, the buffer buf_data 610 retains data after its appearance on the HWDATA bus, which is briefly concurrent with its appearance on the HRDATA bus. The HWDATA bus and HRDATA bus correspond to writing to and reading from the SRAM respectively. From the trace 620 in this view, it is clear that the TRNG asset is written into the anomalous SRAM, which would have been difficult to verify with other methods.

Figure 6B:
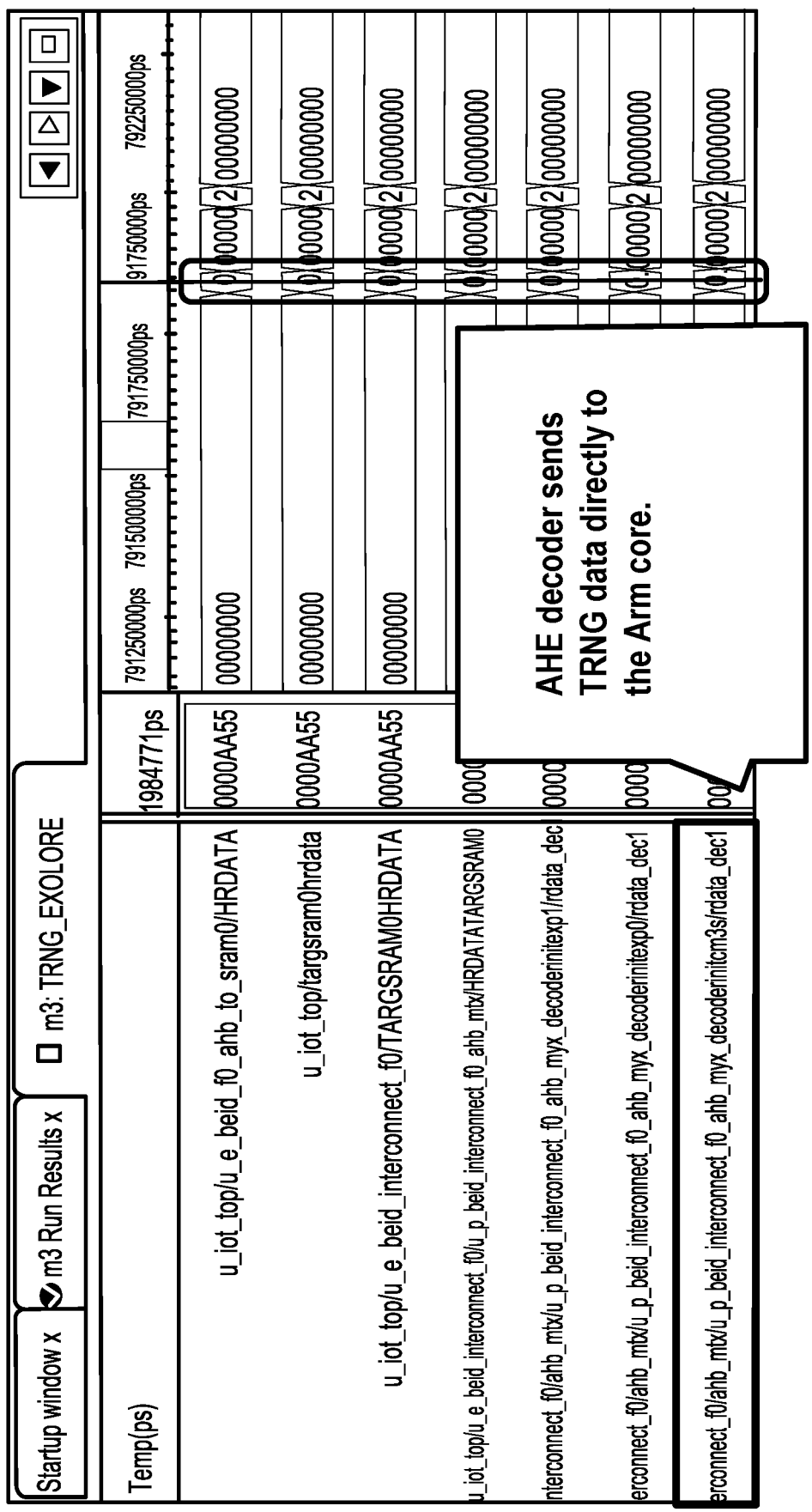

FIG. 6B illustrates another screenshot from an example waveform view. In this example, the loads forward from the HRDATA bus signal are examined. This is a reasonable place to investigate because the waveform view in FIG. 6A indicated that the TRNG asset appeared on the HRDATA bus, which might mean that a read of the TRNG asset from the SRAM occurred in conjunction with a write. Thus, a user can make a user interface selection to trace all loads of the HRDATA bus signal.

As shown in FIG. 6B, the output of the AHB decoder sends the TRNG asset through the CM3S port signal 650 leading directly to the processor. This may or may not be a security vulnerability. It might be, for example, if malicious code can read out the value of the TRNG asset from a register in the processor or store it in another location. Either way, being able to use the waveform view to confirm that the TRNG asset reached the processor is a powerful capability for understanding and mitigating such vulnerabilities.

Figure 7:
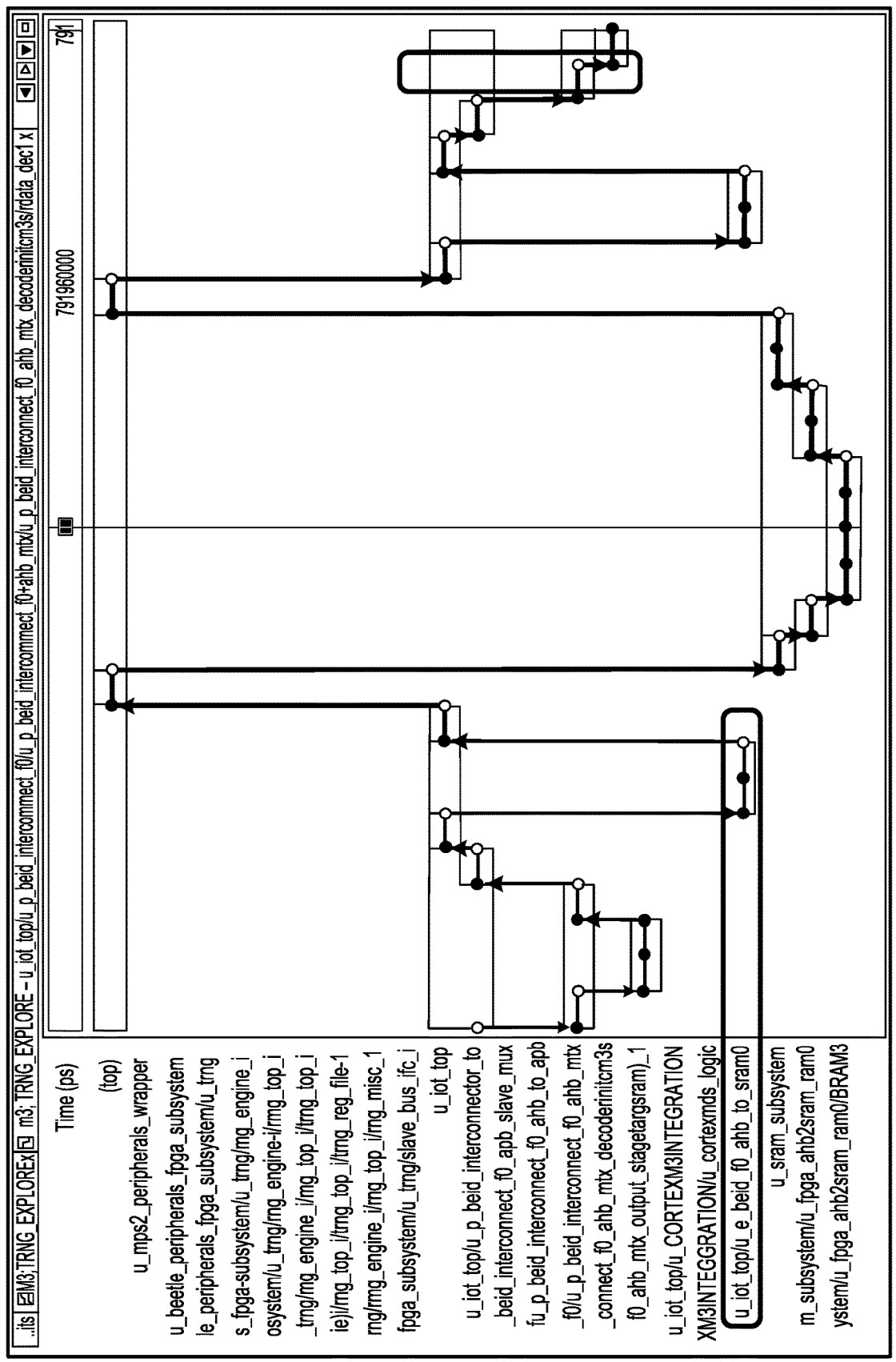
FIG. 7 illustrates a screenshot from an example path view.

Now that it's clear that the TRNG asset reaches the processor, it would be useful to see how it got there. FIG. 7 illustrates a screenshot from an example path view. The example path view explores the rdata_decl signal, which is connected to the input of the processor. A user can switch to the path view by providing user input within the waveform view and making a selection to generate a path view from a particular signal in the waveform view.

The path view graphically illustrates a path 710 taken by the TRNG asset into the processor. The path view thus illustrates a connection through all the modules and system resources through which the TRNG asset flowed. From this view, it is clear that the TRNG asset reached the processor by flowing through the anomalous SRAM 720.

In order to generate a path view, the security exploration system can use timestamps associated with the information flow tracking data in time order when the assets flow through particular system components. The system can then automatically annotate this information with vertical lines to emphasize the exact path taken by a tracked asset through the design. The path information can be generated as described above with reference to FIG. 2, e.g., by creating the information flow version of the hardware design, running a simulation, and storing the results in a database. The database can then be queried in a variety of ways to obtain the paths that populate the path view presentation.

In summary, these examples illustrate how a suite of security exploration tools can allow a user to interactively explore security issues in a design and to continually refine a set of rules used to verify the security of the design. These new capabilities allow a user to identify issues that were previously unknown and even without exactly specifying the issues that are being explored. The hierarchical arrangement of these tools also allow a user to quickly and intuitively navigate the hierarchy of a complex hardware design in order to gain new insights into the information flow characteristics of a design.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML, page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising
receiving an initial hardware design;
generating a modified hardware design including modifying the initial hardware design to insert information flow logic; and
generating input signals and feeding the generated input signals into the modified hardware design to generate a plurality of information flow signals, wherein the information flow signals each associate a respective input signal with a location in the modified hardware design to which the input signal was able to reach through logic circuitry of the modified hardware design;
evaluating the generated information flow signals according to one or more security criteria to generate security results; and
performing one or more security related applications to generate information representing aspects of the design that are vulnerable to insecure behavior.

Embodiment 2 is the method of embodiment 1, wherein generating the input signals comprises performing a concrete simulation that specifies pregenerated bit patterns for the input signals.

Embodiment 3 is the method of any one of embodiments 1-2, wherein generating the input signals comprises connecting the modified hardware design to an operating environment and receiving input signals generated from the operating environment.

Embodiment 4 is the method of any one of embodiments 1-3, wherein evaluating the generated information flow signals according to the one or more security criteria comprises:
determining that a critical design asset flowed to a location in the design specified by the one or more security criteria.

Embodiment 5 is the method of any one of embodiments 1-4, wherein evaluating the generated information flow signals according to the one or more security criteria comprises:
determining that attacker controlled data flowed to a location in the design specified by the one or more security criteria.

Embodiment 6 is the method of any one of embodiments 1-5, wherein evaluating the generated information flow signals according to the one or more security criteria comprises:
storing the information flow signals in an information flow signal database; and
issuing one or more queries to the database, the one or more queries representing the one or more security criteria.

Embodiment 7 is the method of embodiment 6, further comprising ranking or filtering results from the database according to one or more security metrics.

Embodiment 8 is the method of embodiment 6, further comprising generating a user interface presentation that presents result from the database.

Embodiment 9 is the method of embodiment 6, wherein the one or more queries generate results representing a confidentiality vulnerability or an integrity vulnerability.

Embodiment 10 is the method of embodiment 6, wherein the one or more queries generate results representing regions of the design that require physical alterations to mitigate the presence of vulnerabilities after manufacturing.

Embodiment 11 is a method comprising:
receiving a set of security rules for a hardware design having information flow tracking logic;
performing an information flow analysis process to determine where design assets specified by the security rules flow in the hardware design;
generating a user interface presentation that presents a listing of modules through which the design asset flowed and an indication of when a flow of the design asset violated one or more of the security rules.

Embodiment 12 the method of embodiment 11, wherein the user interface presentation visually illustrates how long the design asset was held by each module.

Embodiment 13 is the method of embodiment 12, wherein the user interface presentation visually distinguishes the tracked design asset from other signals.

Embodiment 14 is the method of embodiment any one of embodiments 11-13, further comprising:
receiving a selection of a particular module of the listing of modules; and
generating a waveform view that illustrates signals within the selected module and visually distinguishes signals carrying the tracked design asset within the module.

Embodiment 15 is the method of embodiment 14, further comprising generating a waveform view that illustrates forward loads from a signal within the selected module.

Embodiment 16 is the method of embodiment 15, further comprising:
receiving a user interface selection of a particular signal; and generating a path view that illustrates a path taken by the tracked design asset through the design.

Embodiment 17 is the method of embodiment 16, wherein the path view illustrates how the tracked design asset flows from an origin through a plurality of design resources to the particular signal.

Embodiment 18 is a system comprising: one or more computers and one or more storage devices storing instructions that are operable, when executed by the one or more computers, to cause the one or more computers to perform the method of any one of embodiments 1 to 17.

Embodiment 19 is a computer storage medium encoded with a computer program, the program comprising instructions that are operable, when executed by data processing apparatus, to cause the data processing apparatus to perform the method of any one of embodiments 1 to 17.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving an initial hardware design;
generating a modified hardware design including modifying the initial hardware design to insert information flow logic; and
generating input signals and feeding the generated input signals into the modified hardware design to generate a plurality of information flow signals, wherein the information flow signals each associate a respective input signal with a location in the modified hardware design to which the input signal was able to reach through logic circuitry of the modified hardware design;
evaluating the generated information flow signals according to one or more security criteria to generate security results; and
performing one or more security related applications based on the generated security results to generate information representing aspects of the design that are vulnerable to insecure behavior.

2. The method of claim 1, wherein generating the input signals comprises performing a concrete simulation that specifies pregenerated bit patterns for the input signals.

3. The method of claim 1, wherein generating the input signals comprises connecting the modified hardware design to an operating environment and receiving input signals generated from the operating environment.

4. The method of claim 1, wherein evaluating the generated information flow signals according to the one or more security criteria comprises:
determining that a critical design asset flowed to a location in the design specified by the one or more security criteria.

5. The method of claim 1, wherein evaluating the generated information flow signals according to the one or more security criteria comprises:
determining that attacker controlled data flowed to a location in the design specified by the one or more security criteria.

6. The method of claim 1, wherein evaluating the generated information flow signals according to the one or more security criteria comprises:
storing the information flow signals in an information flow signal database; and
issuing one or more queries to the database, the one or more queries representing the one or more security criteria.

7. The method of claim 6, further comprising ranking or filtering results from the database according to one or more security metrics.

8. The method of claim 6, further comprising generating a user interface presentation that presents result from the database.

9. The method of claim 6, wherein the one or more queries generate results representing a confidentiality vulnerability or an integrity vulnerability.

10. The method of claim 6, wherein the one or more queries generate results representing regions of the design that require physical alterations to mitigate the presence of vulnerabilities after manufacturing.

11. A system comprising:
one or more computers and one or more storage devices storing instructions that are operable, when executed by the one or more computers, to cause the one or more computers to perform operations comprising:
receiving an initial hardware design;
generating a modified hardware design including modifying the initial hardware design to insert information flow logic; and
generating input signals and feeding the generated input signals into the modified hardware design to generate a plurality of information flow signals, wherein the information flow signals each associate a respective input signal with a location in the modified hardware design to which the input signal was able to reach through logic circuitry of the modified hardware design;

evaluating the generated information flow signals according to one or more security criteria to generate security results; and performing one or more security related applications based on the generated security results to generate information representing aspects of the design that are vulnerable to insecure behavior.

12. The system of claim 11, wherein generating the input signals comprises performing a concrete simulation that specifies pregenerated bit patterns for the input signals.

13. The system of claim 11, wherein generating the input signals comprises connecting the modified hardware design to an operating environment and receiving input signals generated from the operating environment.

14. The system of claim 11, wherein evaluating the generated information flow signals according to the one or more security criteria comprises:

determining that a critical design asset flowed to a location in the design specified by the one or more security criteria.

15. The system of claim 11, wherein evaluating the generated information flow signals according to the one or more security criteria comprises:

determining that attacker controlled data flowed to a location in the design specified by the one or more security criteria.

16. The system of claim 11, wherein evaluating the generated information flow signals according to the one or more security criteria comprises:

storing the information flow signals in an information flow signal database; and issuing one or more queries to the database, the one or more queries representing the one or more security criteria.

17. The system of claim 16, wherein the operations further comprise ranking or filtering results from the database according to one or more security metrics.

18. The system of claim 16, wherein the operations further comprise generating a user interface presentation that presents result from the database.

19. The system of claim 16, wherein the one or more queries generate results representing a confidentiality vulnerability or an integrity vulnerability.

20. One or more non-transitory computer storage media encoded with computer program instructions that when executed by one or more computers cause the one or more computers to perform operations comprising:

receiving an initial hardware design;

generating a modified hardware design including modifying the initial hardware design to insert information flow logic; and generating input signals and feeding the generated input signals into the modified hardware design to generate a plurality of information flow signals, wherein the information flow signals each associate a respective input signal with a location in the modified hardware design to which the input signal was able to reach through logic circuitry of the modified hardware design;

evaluating the generated information flow signals according to one or more security criteria to generate security results; and performing one or more security related applications based on the generated security results to generate information representing aspects of the design that are vulnerable to insecure behavior.

* * * * *